United States Patent
Taffish

(10) Patent No.: US 12,308,679 B1
(45) Date of Patent: May 20, 2025

(54) SYSTEM AND METHOD FOR TANGLE FREE PHONE CHARGER CABLE ORGANIZER

(71) Applicant: Moustafa Taffish, London (CA)

(72) Inventor: Moustafa Taffish, London (CA)

(*) Notice: Subject to any disclaimer, the term of this patent is extended or adjusted under 35 U.S.C. 154(b) by 0 days.

(21) Appl. No.: 18/748,648

(22) Filed: Jun. 20, 2024

(51) Int. Cl.
*H02J 7/00* (2006.01)
*H01B 7/00* (2006.01)

(52) U.S. Cl.
CPC .......... *H02J 7/0042* (2013.01); *H01B 7/0045* (2013.01)

(58) Field of Classification Search
CPC .............................. H02J 7/0044; H02J 7/0042
See application file for complete search history.

(56) References Cited

U.S. PATENT DOCUMENTS

| | | |
|---|---|---|
| D875,508 S | 2/2020 | Bailey |
| D911,822 S | 3/2021 | Bailey |
| D924,813 S | 7/2021 | Bailey |
| 2013/0187606 A1* | 7/2013 | Ting ...................... H02J 7/0042 320/114 |
| 2014/0300322 A1* | 10/2014 | Chien ..................... H01R 13/72 320/114 |
| 2015/0303721 A1* | 10/2015 | Johnson ................ H02J 7/0042 248/51 |
| 2018/0342840 A1* | 11/2018 | Messinger ................ H02J 7/02 |

FOREIGN PATENT DOCUMENTS

| | | |
|---|---|---|
| CN | 110445223 A | 11/2019 |
| CN | 218386876 U | 1/2023 |
| KR | 200462763 Y1 | 9/2012 |
| KR | 101432744 B1 | 8/2014 |
| KR | 20140095683 A | 8/2014 |
| KR | 200479686 Y1 * | 2/2016 |

OTHER PUBLICATIONS

Machine translation of KR200479686Y1. (Year: 2024).*

* cited by examiner

*Primary Examiner* — David V Henze-Gongola
(74) *Attorney, Agent, or Firm* — Bold IP PLLC; Christopher Mayle

(57) ABSTRACT

A system and method for a device that allows cable to be wrapped around in a tangle free manner from the outside. The inside of the device allows the charger to slide in. The invention has an inner cavity to receive the charger plug. The outer dimensions, height, width and length are of values that will allow the cable to follow a perimeter almost equivalent to its length. The inner dimensions are of values that allow the charger to slide in and out effortlessly while allowing the charger to be placed into the device such that it is secure enough as not to fall out.

18 Claims, 12 Drawing Sheets

SYSTEM AND METHOD FOR TANGLE FREE PHONE CHARGER CABLE ORGANIZER

FIELD OF DISCLOSURE

The overall field of this invention is device configured to securely but removably house a charger plug and more particularly a device that retains a cord for the changer plug by having the cord wrap around the device in a series of ridges with the ends of the cord stored in receptacles on the exterior of the housing.

BACKGROUND

Cables are vital for many electronic devices, including telephones, computers, and other portable gadgets. Often, cables have extra length, creating slack between connected components. This surplus can cause issues, such as the cable becoming a trip hazard or getting damaged from being stepped on. Furthermore, the length makes cables hard to store during transport and can be time-consuming to unravel. Some cases have been designed to address this. They typically have a main disc around which the cable is wound. The disc, enclosed in an outer casing, can be turned to wind or unwind the cable. However, these cases do not support the charging plug, the initial winding can be complicated, and their size can be a drawback. Therefore, there is a need for a simple solution for cable management that ideally secures the charging plug and the accompanying cable.

SUMMARY

The disclosed technology addresses the need for a better system and method for a device that someone uses while traveling with their phone where they often store the charger plug and the cable separately. This invention allows the cable to be wrapped around in a tangle free manner from the outside. The inside of the device allows the charger plug to slide in. The invention has an inner cavity to receive the charger plug. The outer dimensions, height, width and length are of values that will allow the cable to follow a perimeter almost equivalent to its length. The inner dimensions are of values that allow the charger plug to slide in and out effortlessly while still allowing the charger to be placed into the device such that it is secure enough as not to fall out. On the top side there are a set of teeth flanked by two slots that hold the end of the cable. These slots have a stopper that will allow the cord to slide in but not go through the slot. The slots will also be of dimensions that will allow the ends of the cable to slide in or out effortlessly. On the bottom or opposite side there is a set of teeth aligned to the top teeth.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
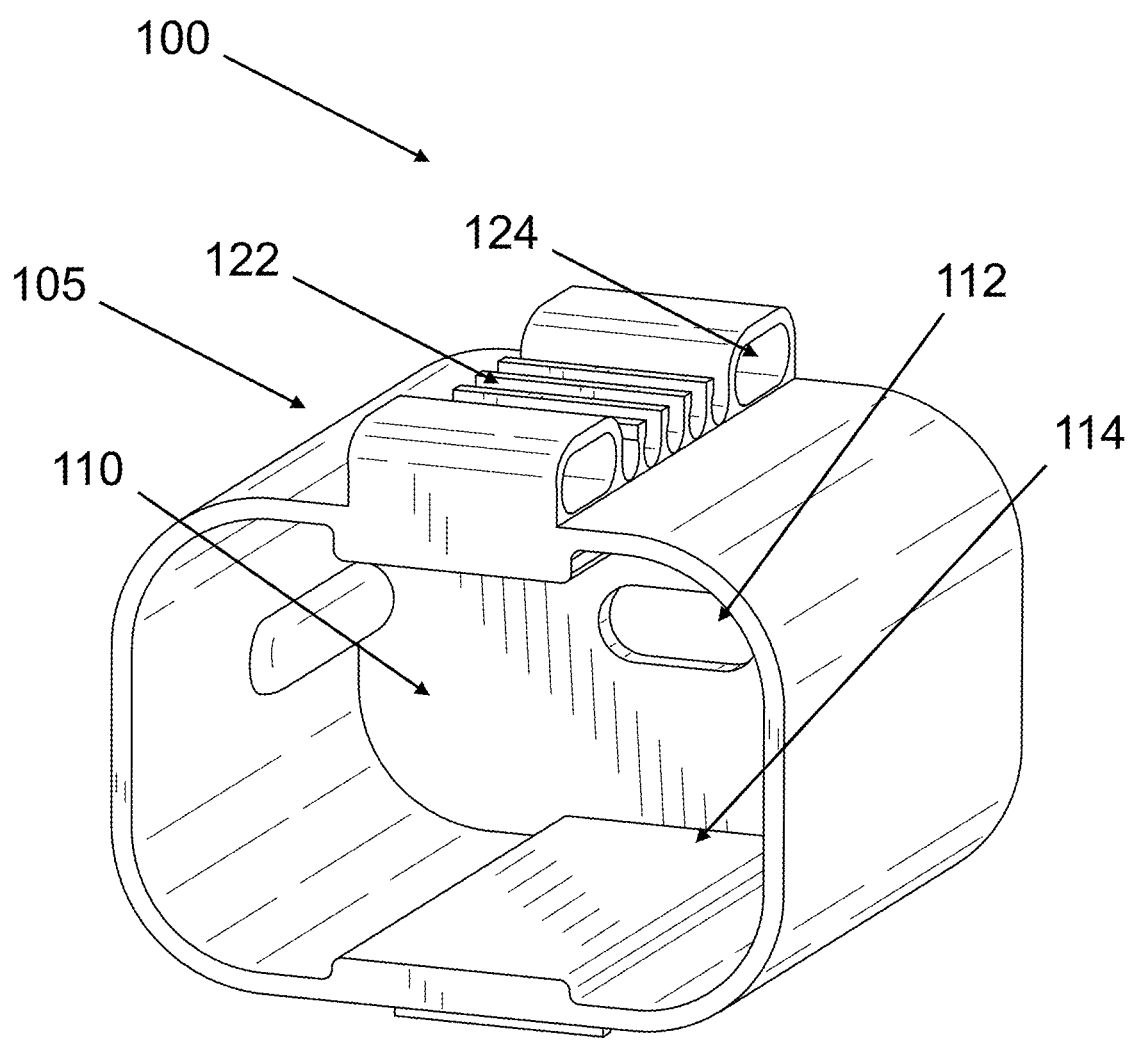
FIG. 1 shows an illustration of a front perspective view of the charger cable organizer.
Figure 2:
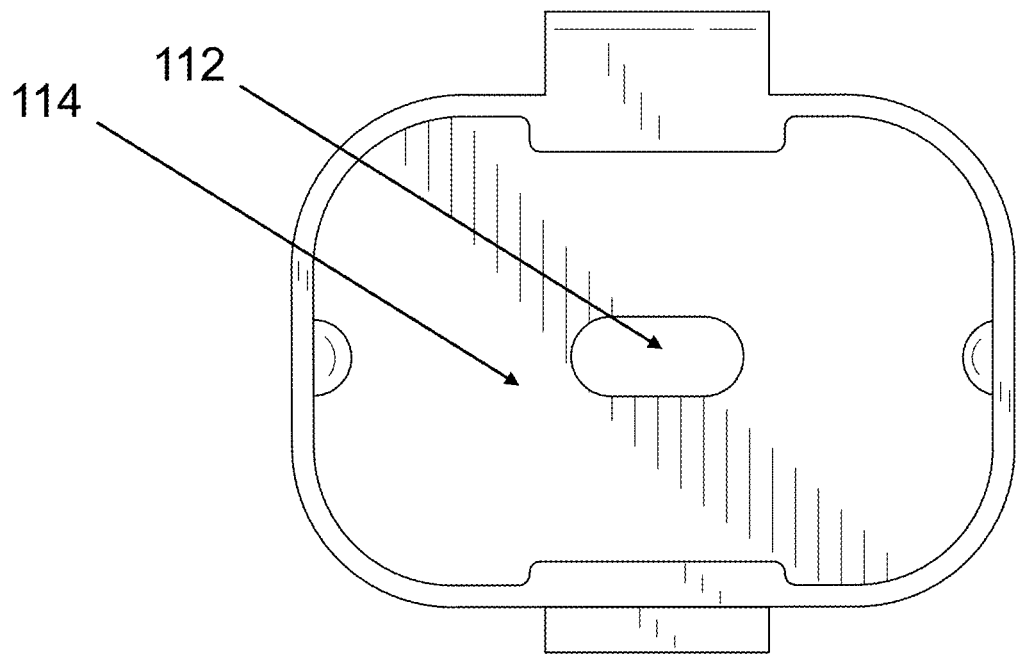
FIG. 2 shows an illustration of a front view of the charger cable organizer.
Figure 3:
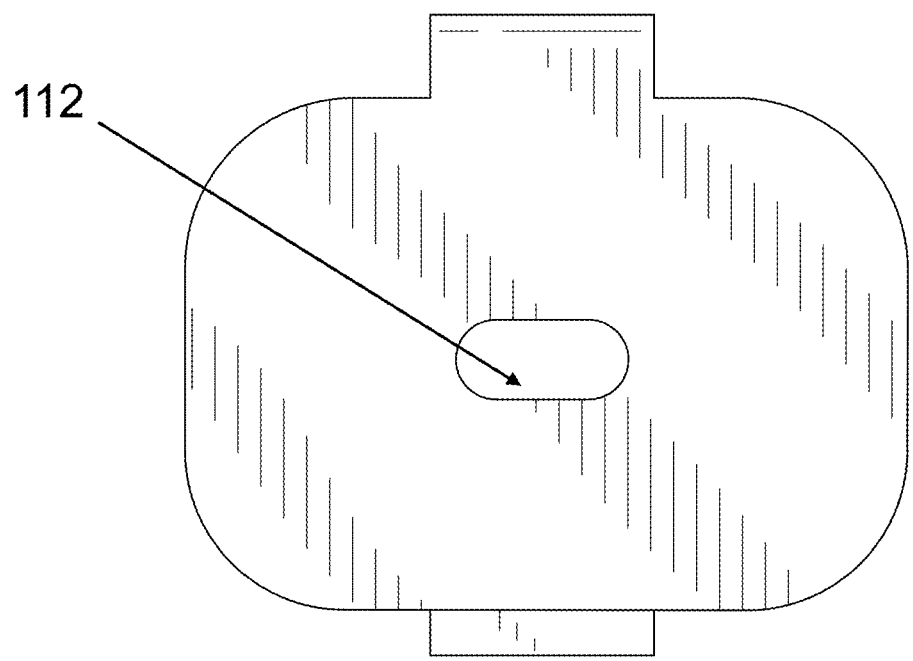
FIG. 3 shows an illustration of a back view of the charger cable organizer.
Figure 4:
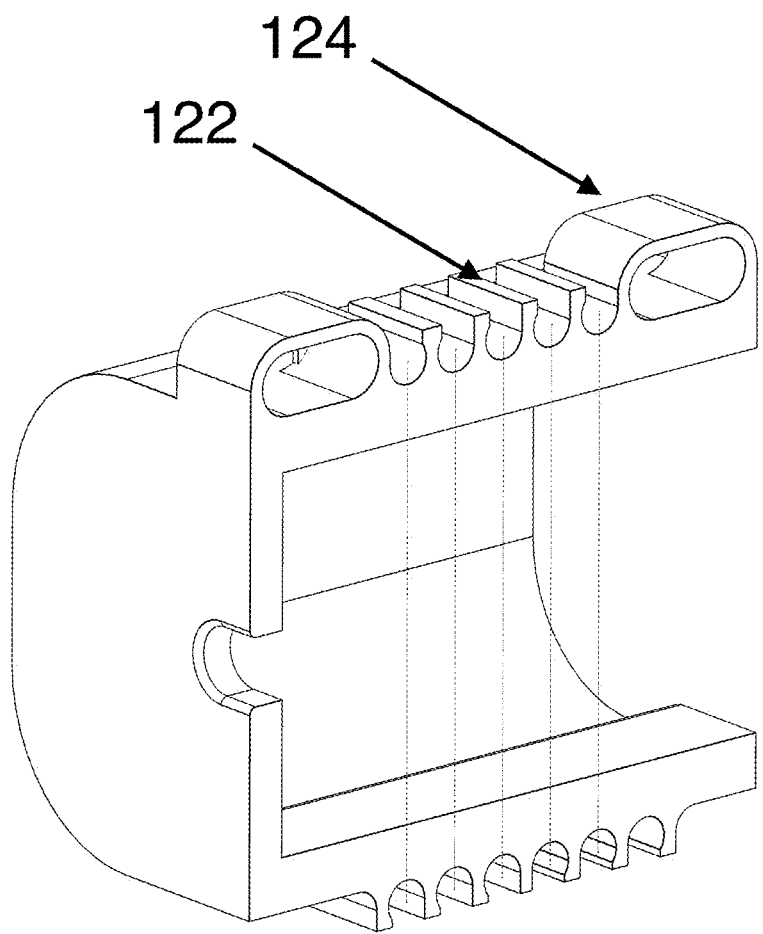
FIG. 4 shows an illustration of a segment side view of the charger cable organizer.
Figure 5:
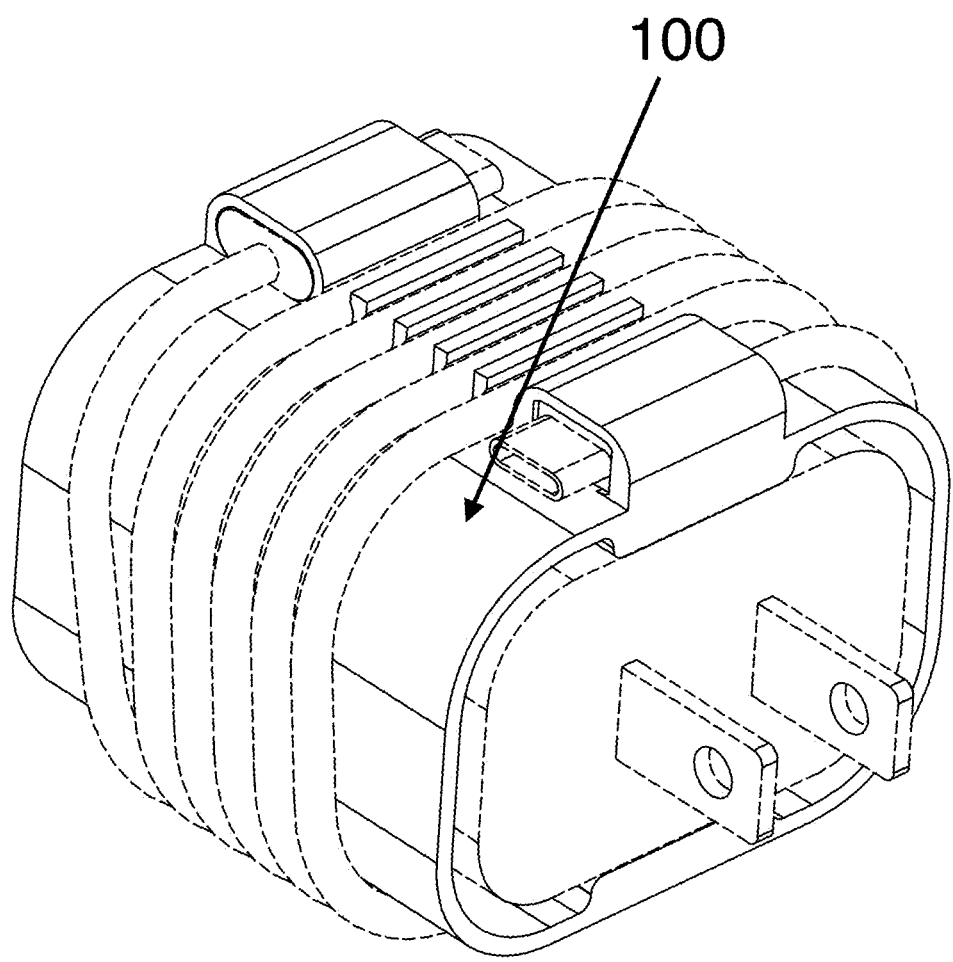
FIG. 5 shows an illustration of the cable, charger, and organizer with a cable and charger in the stored position
Figure 6:
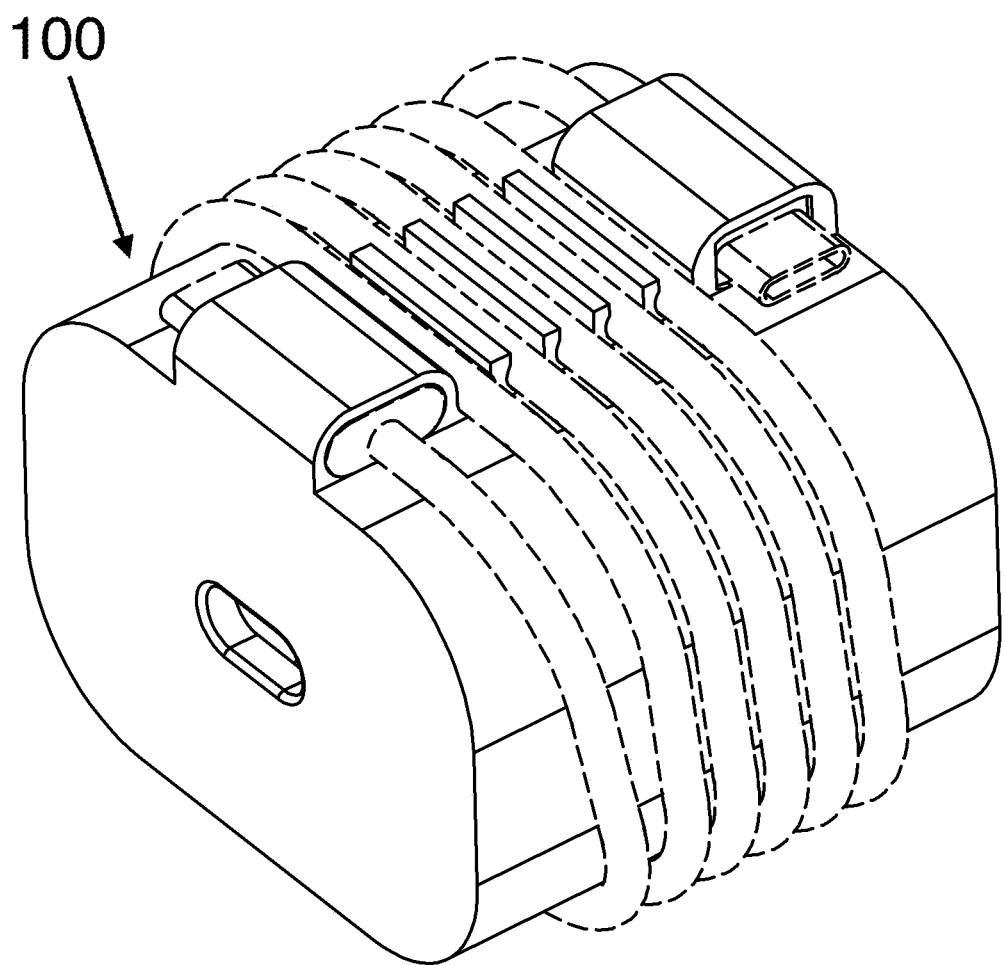
FIG. 6 shows another illustration of the of the charger cable organizer with a cable in the stored position.
Figure 7:
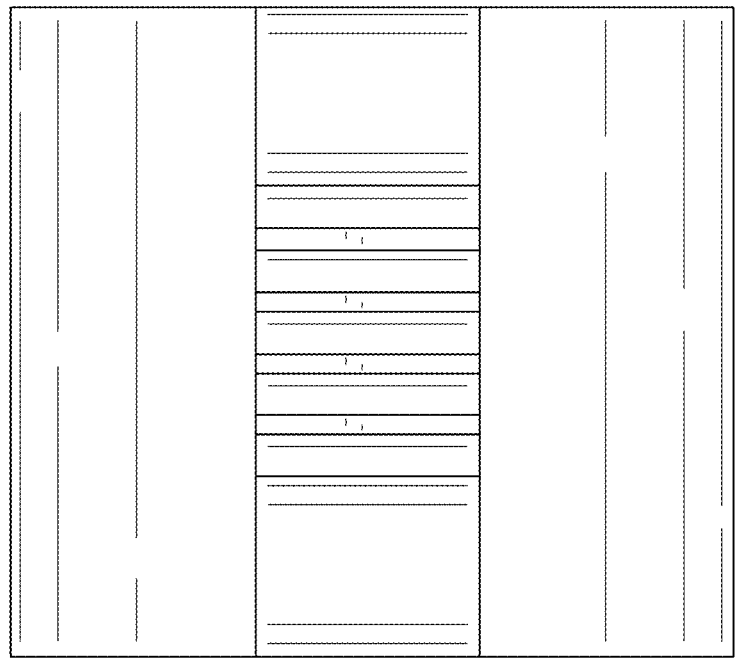
FIG. 7 shows an illustration of a top view of the charger cable organizer.
Figure 8:
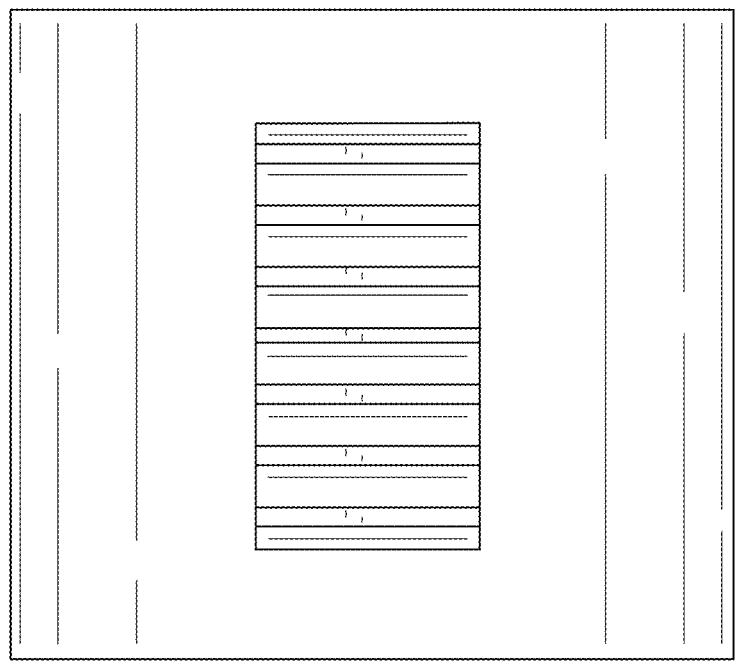
FIG. 8 shows an illustration of a bottom view of the charger cable organizer.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

The present invention is directed to a tangle free phone charger cable organizer that may be standalone or integrated into the body of the charger. During use, a phone charger plug slides into the housing of the device. The device may have a series of ribs/teeth on opposing sides of the exterior to allow wrapping of the cable neatly in a spiral with no overlap whereby the ends of the cable fit into dedicated slots.

A first embodiment of the disclosure is illustrated in FIGS. 1-8. In FIGS. 1-8, the device 100 comprises a body 105 having a hollow cavity or center 110 whereby the shape of body 105 may be determined by the shape of the charger or plug positioned within hollow center 110. Body 105 is approximately oval-like or cube-like or discorectangular prism-like.

Device 100 may be formed of a rubber or plastic or any other suitable material and may be molded, printed, or extruded. Device 100 may be formed as a single unified element (e.g., with the notches integrally formed and attached to the central housing body.

Body 105 may have a first opening 112 at one end of hollow center 110 to securely receive the plug whereby the size of first opening 112 may be determined by the size of the plug positioned within the body 105. Body 105 may have a second opening 112 at a second end of hollow center 110 opposite of first opening 112 to receive an end of a cord whereby the size of second opening 112 may be determined by the size and shape of the cord positioned within the body 105.

Body 105 may have a series of cord retaining elements such as notches 122 extending outward from a central area perimeter of the exterior of body 105 (typically extending from a center top and center bottom of the housing in a parallel configuration where the notches at the top and bottom are aligned). In further embodiments they may be located on other sides including the left and right sides or a combination of the top and bottom and left or right sides. Upper notches 122 typically would be located in proximity to the top surface of body 105 and the lower notches 122 would typically be located in proximity to the bottom surface of body 105 and may have one or more notches than the top. The height of the ridges of notches 122 may be configured based on the thickness of the cord while the number of notches 122 may vary based on the length of the cord such that the cord may wrap around for storage when fully retained. Notches 122 may have a major arcing or semicircle shape such that the ingress is narrower and widens as extending inward on the notch.

Figure 9:
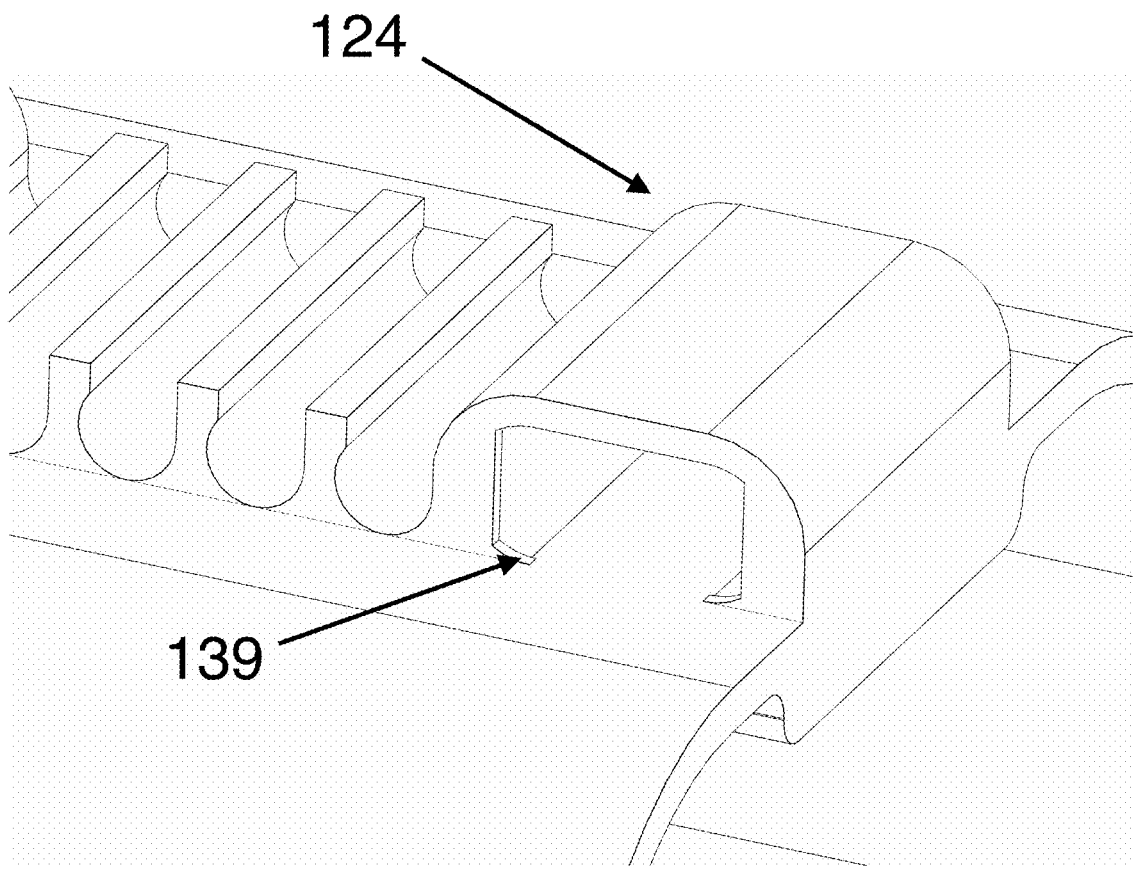
FIG. 9 shows an illustration of a first type of stopper for the receptacle.
Figure 10:
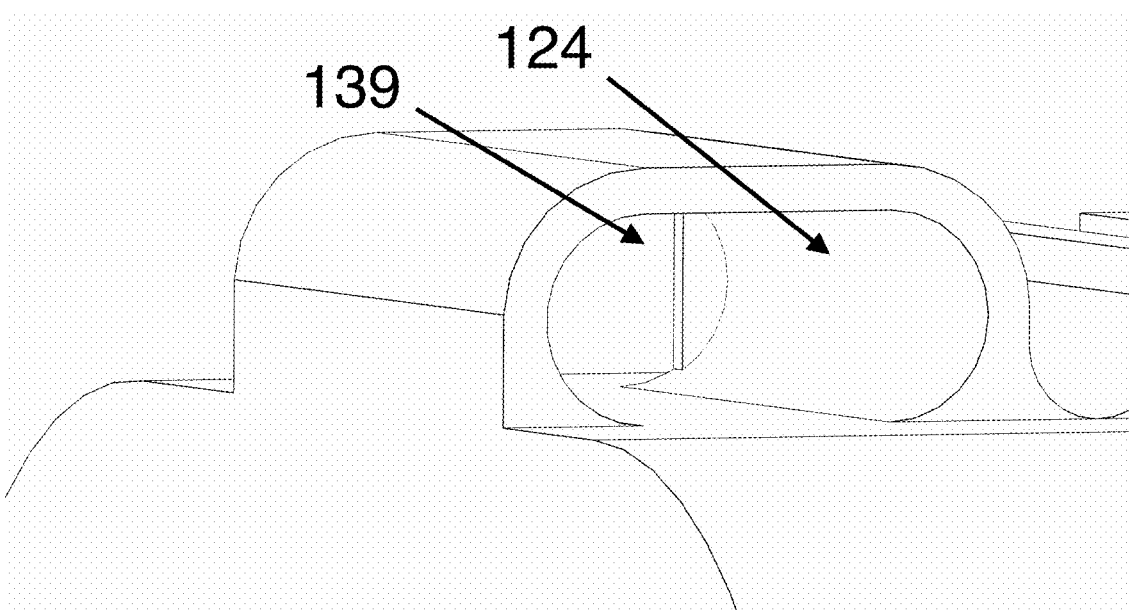
FIG. 10 shows an illustration of a second type of stopper for the receptacle.

Body 105 may have a series of cord end retaining elements such as receptacles 124 extending from outer ends of the exterior of body 105 (typically extending from ends of the top or ends of bottom of the housing). For instance, receptacles 124 may be positioned on either sides of notches 122 on the top surface of the exterior of body 105. Receptacles 124 may have a hollow body with a doubled sided opening or a semi-hollow body with one opening. The shape and size of receptacles may be configured based on the size and shape of the ends of the cord such as oval, square, rectangle, or discorectangle. As illustrated in FIG. 9, receptacle 124 may have a stopper 139 at one end to secure the inserted cable such that the cable may not pass completely through receptacle 124. Stopper 139 may be in the form of a reduced cross section that provides a friction fit for the cable. As illustrated in FIG. 10, receptacle 124 may have a stopper 139 at one end to secure the inserted cable whereby stopper 139 is in the form of a vertical member that extends across receptacle 124.

In use, device 100 has two configurations: a first (e.g., storage) configuration, in which the plug is inserted within body 105 and the cord is wrapped around body 105 in notches 122 and both ends of the cord are retained fixedly in place in receptacles 124 (e.g., within notches). The second (e.g., use) configuration, in which the cord is unwound from body 105 whereby one end of the cord plugs into the charger plug and the other end of the cord plugs into a computer, mobile device, other device, or outlet.

Figure 11:
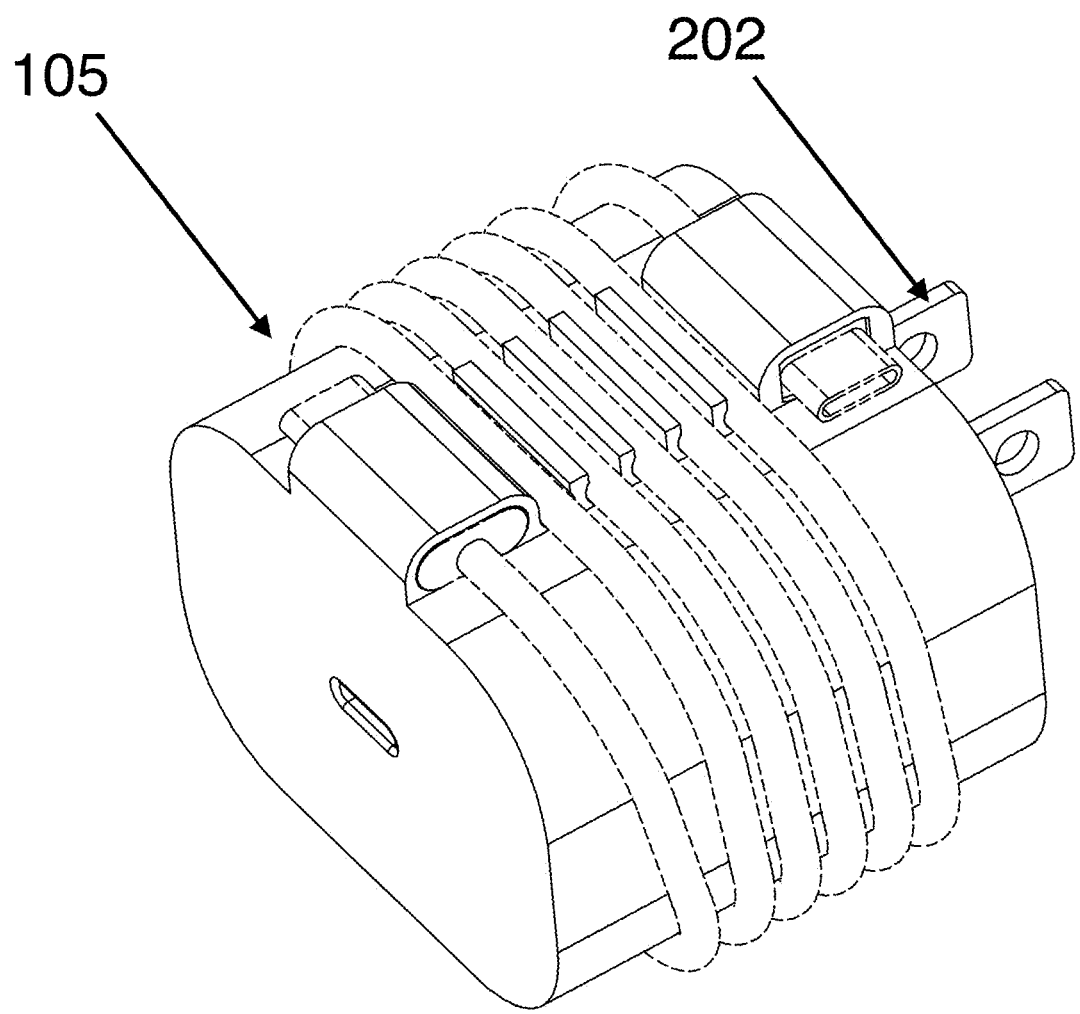
FIG. 11 shows a second embodiment of the charger cable organizer.
Figure 12:
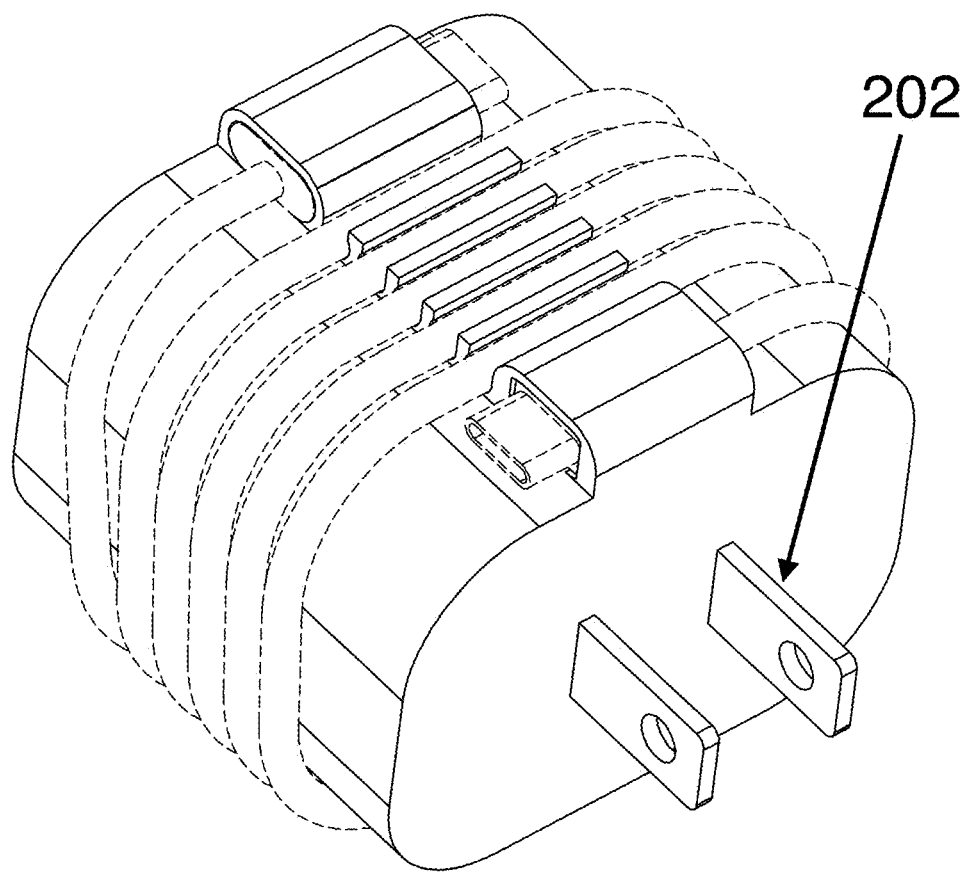
FIG. 12 shows another view of the second embodiment of the charger cable organizer.

As discussed, the plug 202 (any formation of prongs or other adapters) and body 105 may instead be a single piece whereby the body itself is a plug and acts as a holder for the cord with the same functionality of device 100, as illustrated in FIGS. 11-12.

Figure 13:
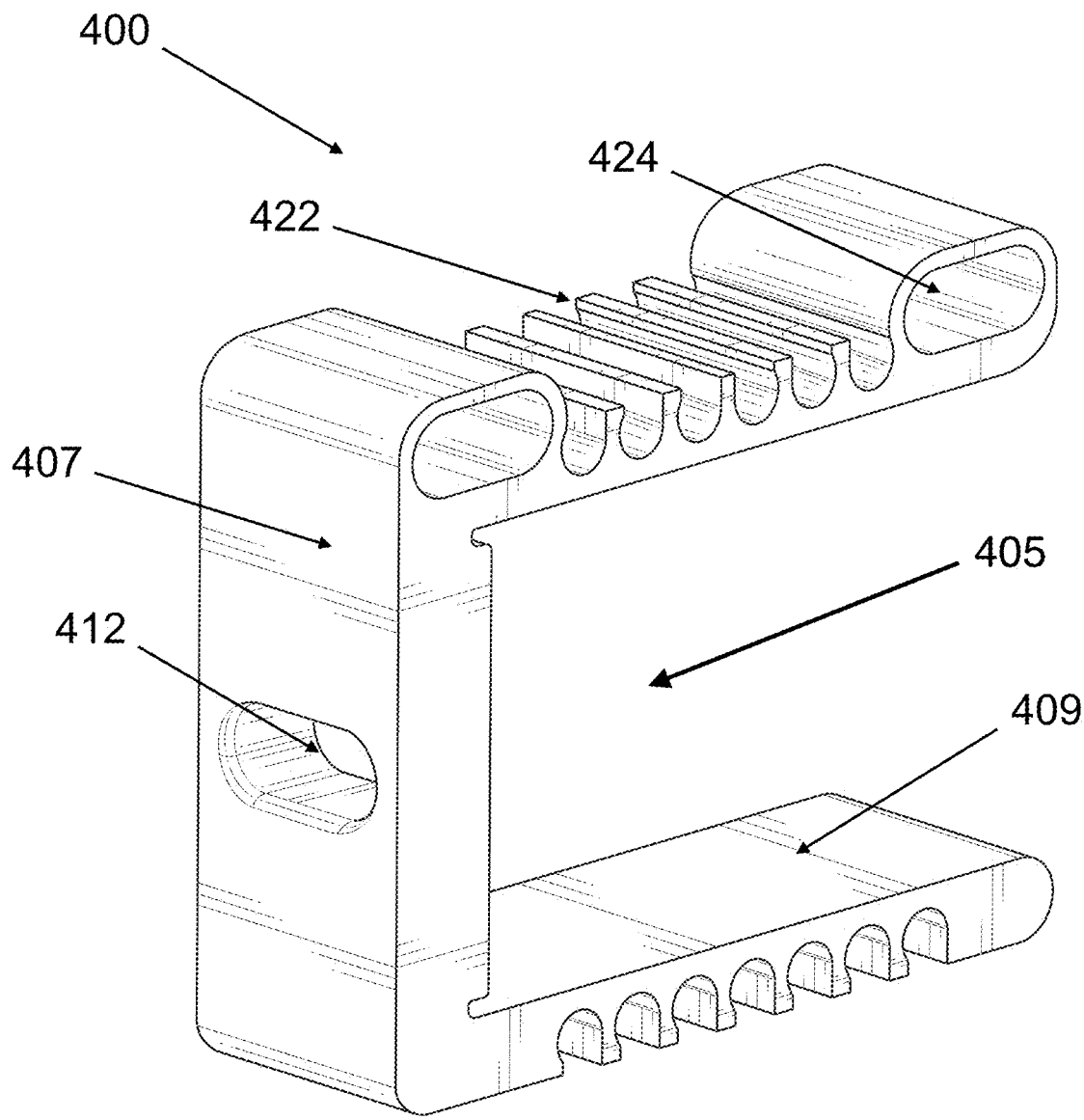
FIG. 13 shows a third embodiment of the charger cable organizer.
Figure 14:
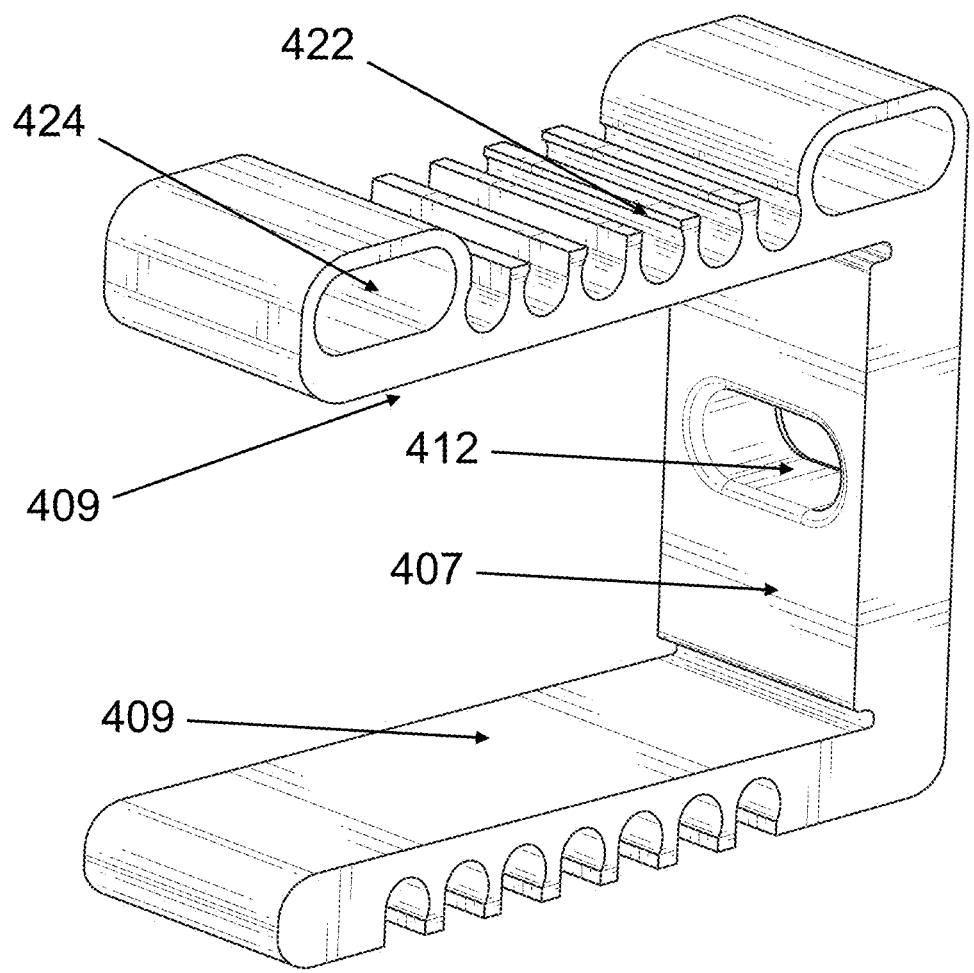
FIG. 14 shows another illustration of the third embodiment of the charger cable organizer.

Further embodiments of the disclosure are illustrated in FIGS. 13-14 with similar functionality to the first embodiment. In FIGS. 13-14, device 400 includes a body with a U-shape with a base surface 407 and two prongs 409 extending from base surface 407 whereby the charger plug may be positioned between two prongs 409. The shape and spacing of two prongs 409 may be determined by the size of the plug. The two prongs 409 may also be in lengths that they may extend along less than or an entire surface of a charger plug. Additionally, the same device 400 with a certain length of prongs 409 may be used on differently sized charger plugs such that its use on one smaller charger plug may cover an entire surface of the charger plug, and on another larger charger plug, device 400 may cover a lesser surface of the larger charger plug but still function to the aesthetics and organization of device 400. The charger plug may be positioned between the two prongs 409 in which the charger plug ends that may have prongs or a receptacle for a cord end may be facing the base surface 407, or the open end opposite base surface 407, or the open ends to either side of the U-shape of the body 405. Body 405 may have a first opening 412 at base surface 407 to receive the cord whereby the size of first opening 412 may be determined by the size of the cord positioned within the body 105.

Body 405 may have a series of cord retaining elements such as notches 422 extending from a central area of the exterior of body 405 (typically extending from the first prong 409 and the second prong 409). Body 405 may have a series of cord end retaining elements such as receptacles 424 extending from proximal and/or distal ends of the exterior of body 405.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A device comprising: a body having an open cavity with a first opening configured to securely fit around a charger or plug and a second opening to receive a cord for the charger or plug, wherein the charger or plug is secured within the open cavity, wherein a series of notches extend outward from a perimeter of the body on a first surface and on a second surface on an opposite side of the body from the first surface such that the cord is positioned in the series of notches on the first surface and the second surface in a first configuration wherein the cord surrounds the body and the charger or plug, wherein a first receptacle and second receptacle extend outward from the perimeter of the body wherein in the first configuration the first receptacle and the second receptacle, ends of the cord are slid in but do not pass completely through the first receptacle or the second receptacle.

2. The device of claim 1: wherein the series of notches on the first surface are positioned in a parallel configuration, wherein the series of notches on the second surface are aligned with the notches on the first surface.

3. The device of claim 2: wherein the series of notches have a major arc or semicircle shape.

4. The device of claim 1: wherein the first receptacle and the second receptacle each have a stopper to allow the cord to slide in but not pass completely through the first receptacle or the second receptacle.

5. The device of claim 4: wherein the first receptacle and the second receptacle extend outward from the first surface, wherein the series of notches on the first surface are positioned between the first receptacle and the second receptacle.

6. The device of claim 5: wherein the stopper is in a form of a reduced cross section within the first receptacle and the second receptacle.

7. A device comprising: a body having a U shape with a base surface connected to a first prong and connected to a second prong at an opposite end of the first prong wherein the first prong and the second prong securely fit around a charger or plug wherein there is an opening on the base surface to receive a cord for the charger or plug, wherein a series of notches extend outward from a perimeter of the body on the first prong and in opposite directions on the second prong such that the cord is positioned in the series of notches on the first prong and the second prong in a first configuration wherein the cord surrounds the body and the charger or plug.

8. The device of claim 7: wherein the series of notches on the first prong are positioned in a parallel configuration, wherein the series of notches on the second prong are aligned with the notches on the first prong.

9. The device of claim 8: wherein the series of notches have a major arc or semicircle shape.

10. The device of claim 7: wherein a first receptacle and second receptacle that are larger than each of the series of notches extend outward from the perimeter of the body wherein ends of the cord are secured in the first receptacle and the second receptacle in the first configuration.

11. The device of claim 10: wherein the series of notches are positioned between the first receptacle and the second receptacle on a top surface of the first prong.

12. The device of claim 11: wherein the first receptacle and the second receptacle are shaped to allow the cord to slide in but not pass completely through the first receptacle or the second receptacle.

13. A device comprising: a charger with a first opening to receive a cord for the charger, wherein a series of notches extend outward from a perimeter of the charger on a first surface and on a second surface on an opposite side of the charger from the first surface such that the cord is positioned in the series of notches on the first surface and the second surface in a first configuration wherein the cord surrounds the charger wherein a first receptacle and second receptacle extend outward from the perimeter of the charger wherein in the first configuration, ends of the cord are slid in but do not pass completely through the first receptacle or the second receptacle.

14. The device of claim 13: wherein the first receptacle and the second receptacle have a stopper.

15. The device of claim 14: wherein the stopper is in a form of a reduced cross section.

16. The device of claim 14: wherein the stopper is in a form of a vertical member that extends across the first receptacle or the second receptacle.

17. A device comprising: a body having a U shape with a base surface connected to a first prong and connected to a second prong at an opposite end of the first prong wherein the first prong and the second prong securely fit around a charger or plug wherein there is an opening on the base surface to receive a cord for the charger or plug, wherein a series of notches extend outward from the body such that the cord is positioned in the series of notches in a first configuration wherein the cord is wrapped around the body, wherein the series of notches are positioned on the first prong and the second prong, wherein the series of notches on the first prong are positioned in a parallel configuration, wherein the series of notches on the second prong are aligned with the notches on the first prong.

18. A device comprising: a body having a u shape that securely fits over a charger or plug wherein there is a cavity on a first surface of the body to receive a cord for the charger or plug, wherein a series of cord securing elements extend outward from the body such that the cord is positioned in the series of cord securing elements in a first configuration wherein the cord is wrapped around the body, wherein the series of cord securing elements are positioned on a second surface and a third surface, wherein the series of cord securing elements on the second surface are positioned in a parallel configuration, wherein the series of cord securing elements on the third surface are aligned with the series of cord securing elements on the second surface.

* * * * *